(12) United States Patent
Siegel et al.

(10) Patent No.: US 9,879,193 B2
(45) Date of Patent: Jan. 30, 2018

(54) SYSTEM AND METHOD FOR CONVERTING BIOMASS MATERIAL INTO ENERGY PRODUCTS

(71) Applicants: Stanley M. Siegel, West Newton, PA (US); Mark Albert Sokalski, Carnegie, PA (US)

(72) Inventors: Stanley M. Siegel, West Newton, PA (US); Mark Albert Sokalski, Carnegie, PA (US)

(73) Assignee: ARC TECHNOLOGIES CORPORATION, Yukon, PA (US)

( * ) Notice: Subject to any disclaimer, the term of this patent is extended or adjusted under 35 U.S.C. 154(b) by 248 days.

(21) Appl. No.: 14/813,596

(22) Filed: Jul. 30, 2015

(65) Prior Publication Data

US 2016/0032205 A1 Feb. 4, 2016

Related U.S. Application Data

(60) Provisional application No. 62/031,217, filed on Jul. 31, 2014.

(51) Int. Cl.
*C10L 3/08* (2006.01)
*C10K 1/02* (2006.01)
*C10B 1/08* (2006.01)
*C10B 53/02* (2006.01)

(52) U.S. Cl.
CPC .................................. *C10L 3/08* (2013.01);
*C10B 1/08* (2013.01); *C10B 53/02* (2013.01);
*C10K 1/026* (2013.01); *Y02E 50/14* (2013.01)

(58) Field of Classification Search
CPC .. C10L 3/08; C10K 1/026; C10B 1/08; C10B 53/02; Y02E 50/14
See application file for complete search history.

(56) References Cited

U.S. PATENT DOCUMENTS

2013/0075244 A1* 3/2013 Eyer .................. C10B 21/02
201/29

FOREIGN PATENT DOCUMENTS

WO WO2006081645 * 8/2006

* cited by examiner

*Primary Examiner* — Cephia D Toomer (57) ABSTRACT

A continuous biomass-to-energy system and method used for production of high-energy fuel, liquids and gases from municipal wastes and organic wastes, where the municipal wastes and organic wastes is processed through a controlled pyrolysis process and a controlled gas separation process to extract products gases from a distillation tower system of the system. The biomass-to-energy system also discharges byproducts that are removed to offsite facilities and a combustible gas stream that can be utilized to generate electricity. By controlling the temperature and pressure, the biomass-to-energy system is able to provide a fully contained process that reduces environmental emission and unnecessary byproducts while accelerating the anaerobic cycle.

9 Claims, 12 Drawing Sheets

SYSTEM AND METHOD FOR CONVERTING BIOMASS MATERIAL INTO ENERGY PRODUCTS

The current application claims a priority to the U.S. Provisional Patent application Ser. No. 62/031,217 filed on Jul. 31, 2014.

FIELD OF THE INVENTION

The present invention relates to a system and method for converting received municipal and organic wastes into energy products. More specifically, the present invention produces energy products from the biomass material, avoids usage of slow landfill degradation of waste, accelerates the energy recovery values from within the municipal waste, and eliminates landfill space requirements.

BACKGROUND OF THE INVENTION

With waste in landfills, it can take upwards of 30 years for the anaerobic cycle to give off the municipal and organic waste's energy as methane (CH4), carbon dioxide (CO2) and non-methane organic compounds (NMOC), which have the potential to leach into our atmosphere or environment. Due to the extended time period of the anaerobic cycle, landfills with waste have become a major problem for general population as they may potentially pollute the surrounding environment.

It is an objective of the present invention to provide a system and method to significantly reduce the timeline of the anaerobic cycle so that biomass material can be efficiently and properly disposed. More specifically, the present invention accelerates this 30-year process into a few hours without releasing any contaminants into the environment. The present invention is able to discharge methane (CH4), carbon dioxide (CO2) and non-methane organic compounds (NMOC) from the organic waste and create a closed loop system for potentially harmful gases to eliminate environment pollution.

DETAIL DESCRIPTIONS OF THE INVENTION

All illustrations of the drawings are for the purpose of describing selected versions of the present invention and are not intended to limit the scope of the present invention.

The present invention is a continuous biomass-to-energy system and method used for production of high-energy fuel, liquids and gases from municipal wastes and organic wastes. The present invention receives municipal and organic wastes directly from local or long haul carriers to avoid using partially degraded landfill waste, to recover the maximum energy from within the municipal waste, and to eliminate landfill space requirements. The present invention is unlike placing waste into landfills, where the waste could take 30 years for the anaerobic cycle to give off the municipal and organic waste's energy as methane (CH4), carbon dioxide (CO2), and non-methane organic compounds (NMOC) that have the potential to leach into our atmosphere or environment. As a result, the present invention accelerates this 30-year process into a few hours without releasing any harmful contaminants into the environment.

Figure 1:
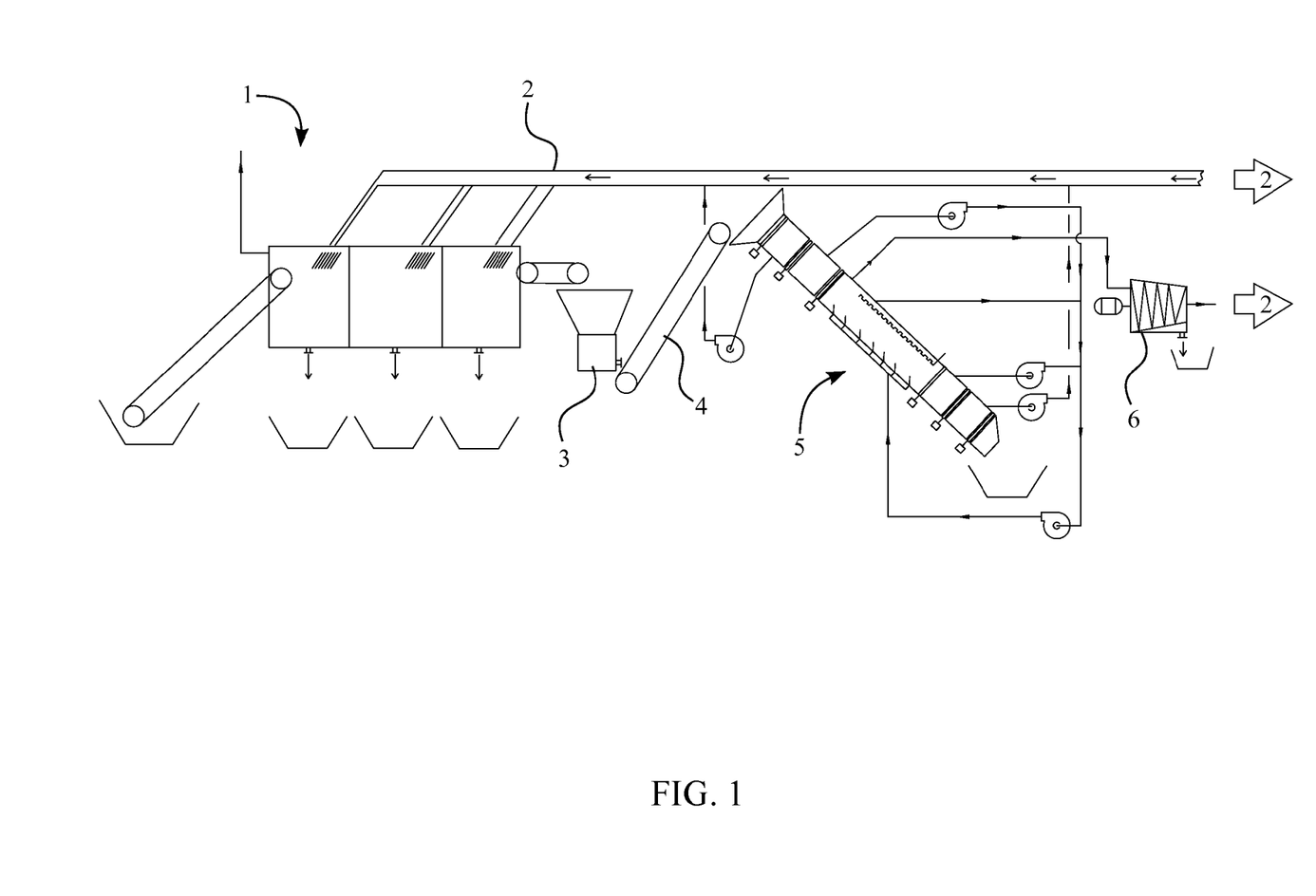
FIG. 1 is a process flow diagram of the preferred system of the present invention.

The preferred system of the present invention comprises a screen-conveyer belt unit 1, a hot-air conduit system 2, a material crusher 3, a transferring-conveyer belt system 4, a pyrolysis unit 5, a centrifuge unit 6, a cooling unit 7, a distillation tower system 8, and at least one gas discharge port 10. In reference to FIG. 1-3, which illustrate the basic configuration of the preferred system, the screen-conveyer belt unit 1 is in fluid communication with the hot-air conduit system 2 and operatively coupled with the material crusher 3. The pyrolysis unit 5 is then operatively coupled with the material crusher 3 through the transferring-conveyer belt system 4. The pyrolysis unit 5 is also in fluid communication with the cooling unit 7 through the centrifuge unit 6, opposite of the transferring-conveyer belt system 4. Then the at least one gas discharge port 10 is in fluid communication with the cooling unit 7 through the distillation tower system 8, completing the preferred system.

Figure 6:
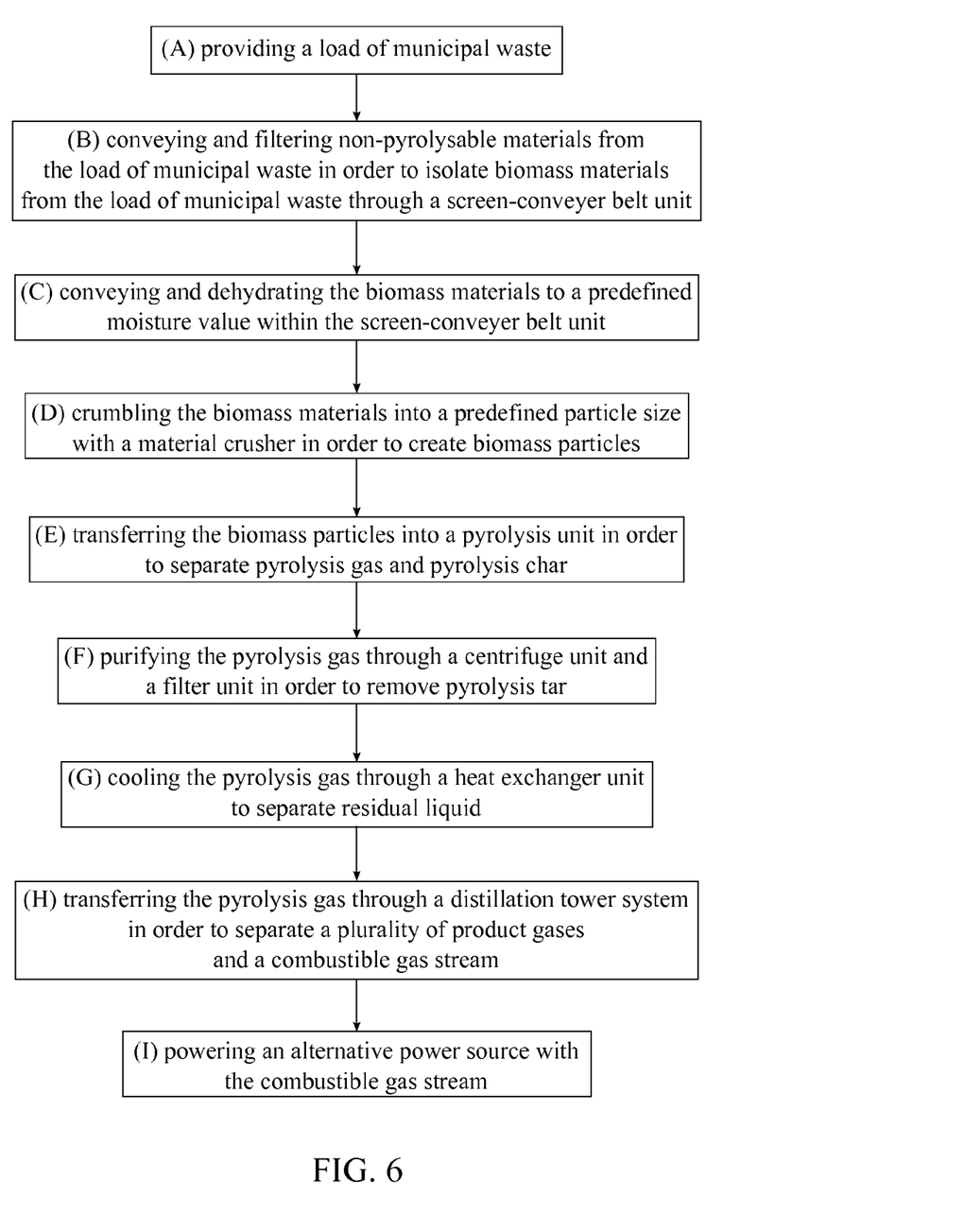
FIG. 6 is a basic overall process for the preferred method of the present invention.

In reference to FIG. 6, the preferred method of the present invention begins as delivery trucks deliver a load of municipal waste so that the screen-conveyer belt unit 1 is able to convey and filter non-pyrolysable materials from the load of municipal waste in order to isolate biomass materials from the load of municipal waste. More specifically, the load of municipal waste is dumped into a loading bin of the screen-conveyer belt unit 1 as the load of municipal waste processes through a serious of sorting units. The serial sorting unit can be made up of spinning drums, star screens, sizing screens, conveying glass screen separators, magnetic separators, eddy current separators, other types of commercial available solid material handling separators and classifiers.

The preferred method requires the majority of the glass/ceramic/stone-like solids, ferrous metals, and non-ferrous metals to be removed from the load of municipal waste and these unwanted materials are sent to an off-site recycling center. More specifically, a glass/ceramic/stone separator of the screen-conveyer belt unit 1 is used to separate the glass/ceramic/stone-like solids form the load of municipal waste into its own discharge stream. Additionally, a magnetic separator of the screen-conveyer belt unit 1 removes the ferrous metals into a separate discharge stream while an eddy current separator of the screen-conveyer belt unit 1 removes the non-ferrous metals into another discharge stream where each material stream is sent to the off-site recycling center. In many of the existing municipal waste gathering areas, transfer stations are utilized to separate the cardboard, paper, and most types of plastic materials from a mixture of municipal waste, which if utilized, would reduce the fuel source loading for the preferred method. As a result, the preferred system does not utilize the transfer stations to separate cardboard, paper, and most types of plastic materials; however, other off-site transfer stations may supplement their cardboard, paper, and plastics as additional biomass materials into the preferred system.

In reference to FIG. 6, the biomass materials are conveyed and dehydrated within the screen-conveyer belt unit 1 by the hot-air conduit system 2 so that the water content of the biomass materials can be reduced. More specifically, the hot-air conduit system 2 preheats and dries the biomass materials into a predefined moisture value while the biomass materials process through the glass/ceramic/stone separator, the magnetic separator, and the eddy current separator. The hot-air conduit system 2 is able to recover heat energy through the downstream process of a primary heat exchanger 72 of the cooling unit 7 and through a first vacuum blower 64 and a fourth vacuum blower 67 of the pyrolysis unit 5. The primary heat exchanger 72, the first vacuum blower 64, and the fourth vacuum blower 67 are in fluid communication with the hot-air conduit system 2 so that the heat energy from the hot-air conduit is able to reduce the moisture content of the biomass material less than 30% by weight.

Then the biomass is transferred into the material crusher 3 that is positioned at the end of the screen-conveyer belt unit 1. In reference to FIG. 6, the biomass materials are fed into the material crusher 3 so that the biomass materials can be crumbled into a predefined particle size that is known as biomass particles. The predefined particle size is preferably crushed approximately ⅜ inch or less. In an alternative system of the present invention can bypass the glass/ceramic/stone separator and the eddy current separator, allowing the shredding and crushing of these materials in the material crusher 3, which reduces equipment capital cost of the overall process. However, the resulting char leaving the alternative system through the pyrolysis unit 5 may contain the glass/ceramic/stone and nonferrous metals.

In reference to FIG. 6, the biomass particles are then transferred into the pyrolysis unit 5 through the transferring-conveyer belt system 4, where the pyrolysis unit 5 is able to separate pyrolysis gas and pyrolysis char for further operations of the preferred method. In reference to FIG. 4, the pyrolysis unit 5 comprises a first pyrolysis chamber 51, a second pyrolysis chamber 52, a main pyrolysis chamber 53, a third pyrolysis chamber 56, a fourth pyrolysis chamber 57, a pneumatic entry door 58, a first pneumatic release door 59, a second pneumatic release door 60, a third pneumatic release door 61, a fourth pneumatic release door 62, a pneumatic discharge door 63, a second vacuum blower 65, a third vacuum blower 66, and a central vacuum blower 68 in addition to the first vacuum blower 64 and the fourth vacuum blower 67.

Figure 7:
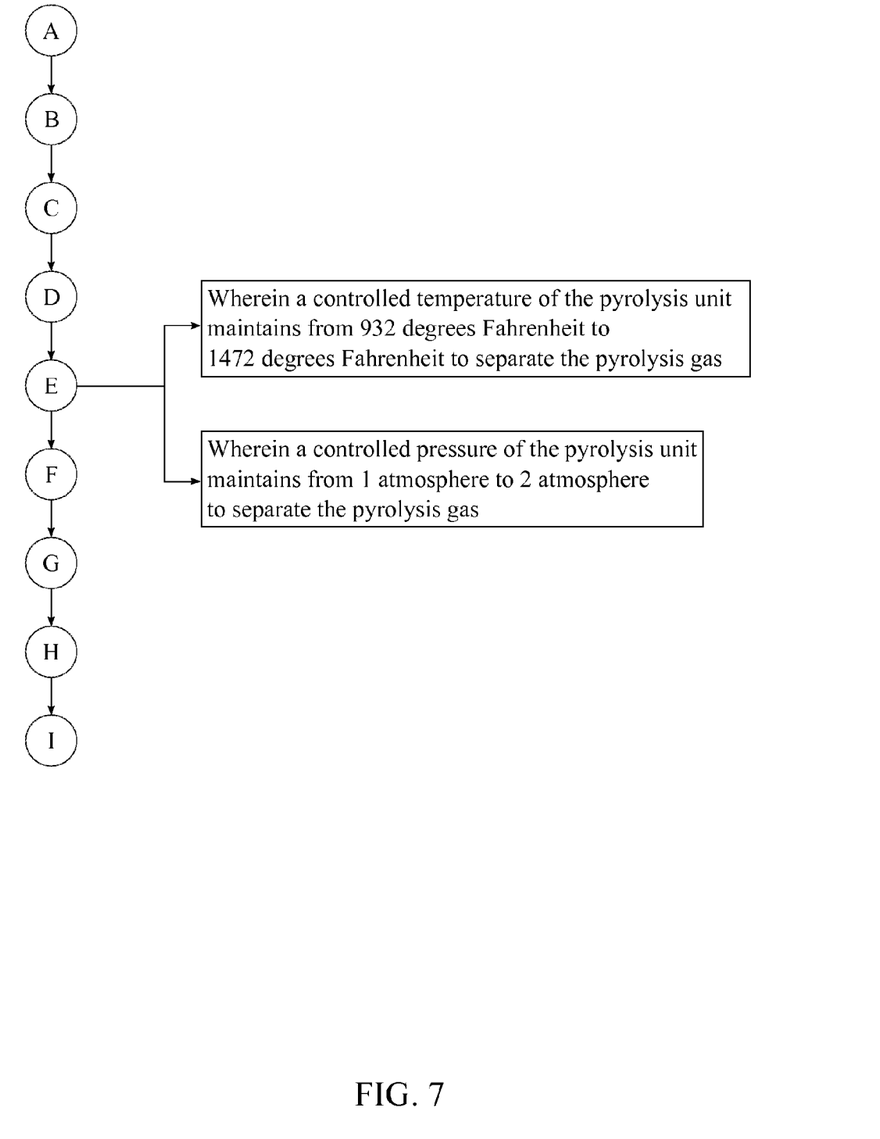
FIG. 7 is a basic illustration showing system parameters of the preferred method within the overall process.

The first pyrolysis chamber 51, the second pyrolysis chamber 52, the main pyrolysis chamber 53, the third pyrolysis chamber 56, and the fourth pyrolysis chamber 57 represent different chambers that the biomass particles transfer through to separate the pyrolysis gas and pyrolysis char. In reference to FIG. 1 and FIG. 4, the first pyrolysis chamber 51 is adjacently positioned with the transferring-conveyer belt system 4 while the second pyrolysis chamber 52 is adjacently positioned with the first pyrolysis chamber 51, opposite of the transferring-conveyer belt system 4. The main pyrolysis chamber 53 is adjacently positioned with the second pyrolysis chamber 52, opposite of the first pyrolysis chamber 51. The main pyrolysis chamber 53 is equipped with temperature controlled electrical heaters that are incorporated into the walls of the main pyrolysis chamber 53. The electric heaters are programmed to maintain both a controlled temperature of the pyrolysis unit 5 from 932 degrees Fahrenheit (F) to 1472 F and a controlled pressure of the pyrolysis unit 5 maintains from 1 atmosphere to 2 atmosphere in order to separate the pyrolysis gas as shown in FIG. 7. The third pyrolysis chamber 56 is adjacently positioned with the main pyrolysis chamber 53, opposite of the second pyrolysis chamber 52 while the fourth pyrolysis chamber 57 is adjacently positioned with the third pyrolysis chamber 56, opposite of the main pyrolysis chamber 53.

The pneumatic entry door 58, the first pneumatic release door 59, the second pneumatic release door 60, the third pneumatic release door 61, the fourth pneumatic release door 62, and the pneumatic discharge door 63 control the movement of the biomass particles according to the parameters of the preferred method. In reference to FIG. 4, the pneumatic entry door 58 is positioned with the first pyrolysis chamber 51 while the first pneumatic release door 59 is adjacently positioned between the first pyrolysis chamber 51 and the second pyrolysis chamber 52. When the biomass particles are fed into the pyrolysis unit 5 from the transferring-conveyer belt system 4 and through the opened position of the pneumatic entry door 58, the biomass particles are able to collect within the first pyrolysis chamber 51 due to the closed position of the first pneumatic release door 59. Once the biomass particles reach a proper level within the first pyrolysis chamber 51, the biomass particles are transferred into the second pyrolysis chamber 52 through the opened position of the first pneumatic release door 59. Then the biomass particles are able to collect within the second pyrolysis chamber 52 as the second pneumatic release door 60, which is adjacently positioned between the second pyrolysis chamber 52 and the main pyrolysis chamber 53, is at the closed position. When the biomass particles reach a proper level within the second pyrolysis chamber 52, the biomass particles are transferred into the main pyrolysis chamber 53 through the opened position of the second pneumatic release door 60. Then the biomass particles are able to collect within the main pyrolysis chamber 53 as the third pneumatic release door 61, which is adjacently positioned between the main pyrolysis chamber 53 and the third pyrolysis chamber 56, is at the closed position. When the biomass particles are within the main pyrolysis chamber 53, the electric heaters are able to ignite the biomass particles and separates the pyrolysis gas and the pyrolysis char. The pyrolysis char is then transferred into the third pyrolysis chamber 56 through the opened position of the third pneumatic release door 61. Then the pyrolysis char is collected within the third pyrolysis chamber 56 as the fourth pneumatic release door 62, which is adjacently positioned between the third pyrolysis chamber 56 and the fourth pyrolysis chamber 57, is at the closed position. The pyrolysis char is then transferred into the fourth pyrolysis chamber 57 through the opened position of the fourth pneumatic release door 62. Then the biomass particles is collected within the fourth pyrolysis chamber 57 as the pneumatic discharge door 63, which is adjacently positioned with the fourth pyrolysis chamber 57, is at the closed position.

After the biomass particles are collected within the first pyrolysis chamber 51, the pneumatic entry door 58 is switched to the closed position so that the first vacuum blower 64 is able to vacuum the first pyrolysis chamber 51 to less than 38 torr (Torr). In reference to FIG. 1 and FIG. 4, since the first vacuum blower 64 is in fluid communication with the hot-air conduit system 2 and the first pyrolysis chamber 51, the first vacuum blower 64 is able to vacuum the first pyrolysis chamber 51 according to the preferred specifications and discharges the vacuumed-air from the first pyrolysis chamber 51 to the hot-air conduit system 2.

Once the biomass particles are collected within the second pyrolysis chamber 52, the first pneumatic release door 59 is switched to the closed position so that the second vacuum blower 65 is able to vacuum the second pyrolysis chamber 52 to less than 38 Torr. In reference to FIG. 4, the second vacuum blower 65 is able to vacuum the second pyrolysis chamber 52 and discharges the vacuumed-gas from the second pyrolysis chamber 52 to the central vacuum blower 68 as the second vacuum blower 65 is in fluid communication with the central vacuum blower 68.

Figure 4:
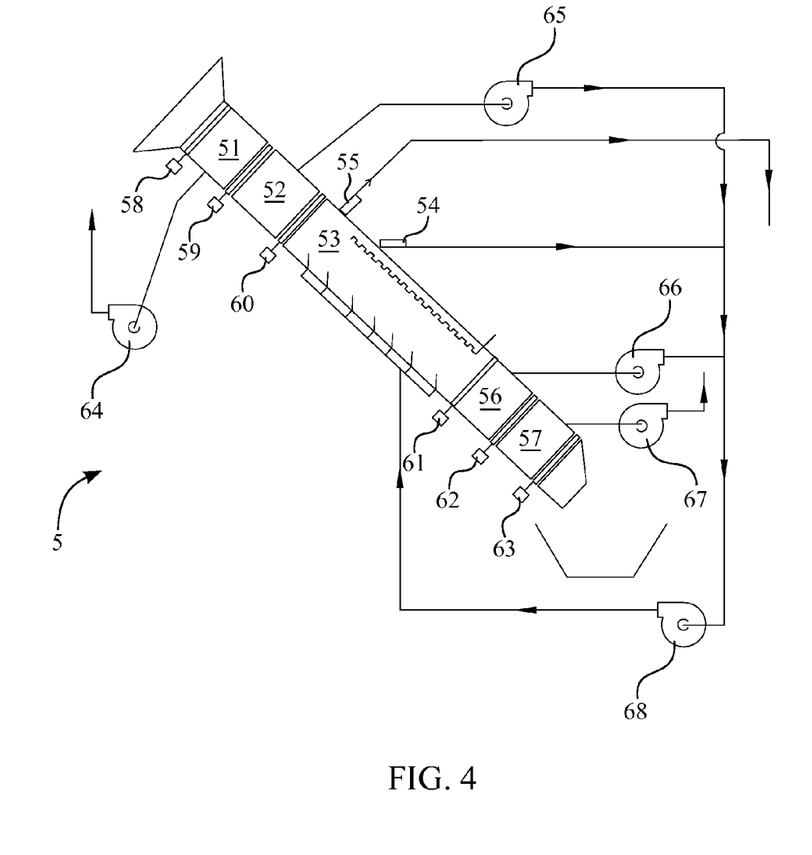
FIG. 4 is a detail view of the pyrolysis unit of the preferred system of the present invention.

During the ignition process of the biomass particles, within the main pyrolysis chamber 53, the second pneumatic release door 60 is switched to the closed position so that the central vacuum blower 68 is able to control the vacuum and pressure of the main pyrolysis chamber 53 to less than 38 Torr. More specifically, the central vacuum blower 68 circulates gases from the main pyrolysis chamber 53 through a first outlet 54 of the main pyrolysis chamber 53 and cycles the gases back into the main pyrolysis chamber 53 as the central vacuum blower 68 is in fluid communication with the main pyrolysis chamber 53.

The third vacuum blower 66 functions similar to the second vacuum blower 65. More specifically, when the pyrolysis char is collected within the third pyrolysis chamber 56, the third pneumatic release door 61 is switched to the closed position so that the third vacuum blower 66 can vacuum the third pyrolysis chamber 56 to less than 38 Torr. In reference to FIG. 4, the third vacuum blower 66 is able to vacuum the third pyrolysis chamber 56 and discharges the vacuumed-gas from the third pyrolysis chamber 56 to the central vacuum blower 68 as the third vacuum blower 66 is in fluid communication with the central vacuum blower 68.

Since the second vacuum blower 65 and the third vacuum blower 66 are in fluid communication with the central vacuum blower 68 and the central vacuum blower 68 is in fluid communication with the main pyrolysis chamber 53, any harmful gases that may exit from the second pyrolysis chamber 52, the main pyrolysis chamber 53, and the third pyrolysis chamber 56 can be trapped and cycled within the pyrolysis unit 5. As a result, the pyrolysis unit 5 does not discharge harmful byproduct gases to the atmosphere, creating an efficient and eco-friendly system.

After the pyrolysis char is collected within the fourth pyrolysis chamber 57, the fourth pneumatic release door 62 is switched to the closed position so that the fourth vacuum blower 67 can vacuum the fourth pyrolysis chamber 57 to less than 38 Torr. In reference to FIG. 1 and FIG. 4, since the fourth vacuum blower 67 is in fluid communication with the hot-air conduit system 2 and the fourth pyrolysis chamber 57, the fourth vacuum blower 67 is able to vacuum the fourth pyrolysis chamber 57 according to the preferred specifications and discharge the vacuumed-air from the fourth pyrolysis chamber 57 to the hot-air conduit system 2.

The pyrolysis char from the ignition process is released from the preferred system through the pneumatic discharge door 63 and removed off-site as a byproduct. In reference to FIG. 1 and FIG. 6, the in fluid communication between the pyrolysis unit 5 and the centrifuge unit 6 is maintained by a second outlet 55 of the main pyrolysis chamber 53 so that the pyrolysis gas can be further purified. More specifically, major amount of tar is removed from the pyrolysis gas and placed into the tar removal bin by the centrifuge unit 6 as the removed tar is later transferred into an off-site as a byproduct. The centrifuge unit 6 then conveys the pyrolysis gas into the cooling unit 7.

The cooling unit 7, which comprises a filter unit 71, an inlet air blower 73, and a condensing drum 74 in addition to the primary heat exchanger 72, further purifies the pyrolysis gas and separates residual liquid. In reference to FIG. 1-2 and FIG. 6, the filter unit 71 is in fluid communication with the second outlet 55 of the main pyrolysis chamber 53 while the primary heat exchanger 72 is in fluid communication with the filter unit 71, the inlet air blower 73, the hot-air conduit system 2, and the condensing drum 74. More specifically, the pyrolysis gas travels through the filter unit 71 to eliminate the last of any residual tars and enters into the primary heat exchanger 72. The filter unit 71 can be composed of regenerative sand filters or two layers of sand and a high-efficiency particulate air (HEPA) filter. The primary heat exchanger 72 pulls atmospheric air from the inlet air blower 73 and cools down the pyrolysis gas to a temperature of 100 F to 130 F as the condensing drum 74 collects liquids that may drop out after cooling process of the pyrolysis gas. The removed heat energy from the pyrolysis gas is then supplied into the hot-air conduit system 2 through the primary heat exchanger 72 so that the heat energy can be supplied to the screen-conveyer belt unit 1 to reduce the water content of the biomass materials.

Figure 2:
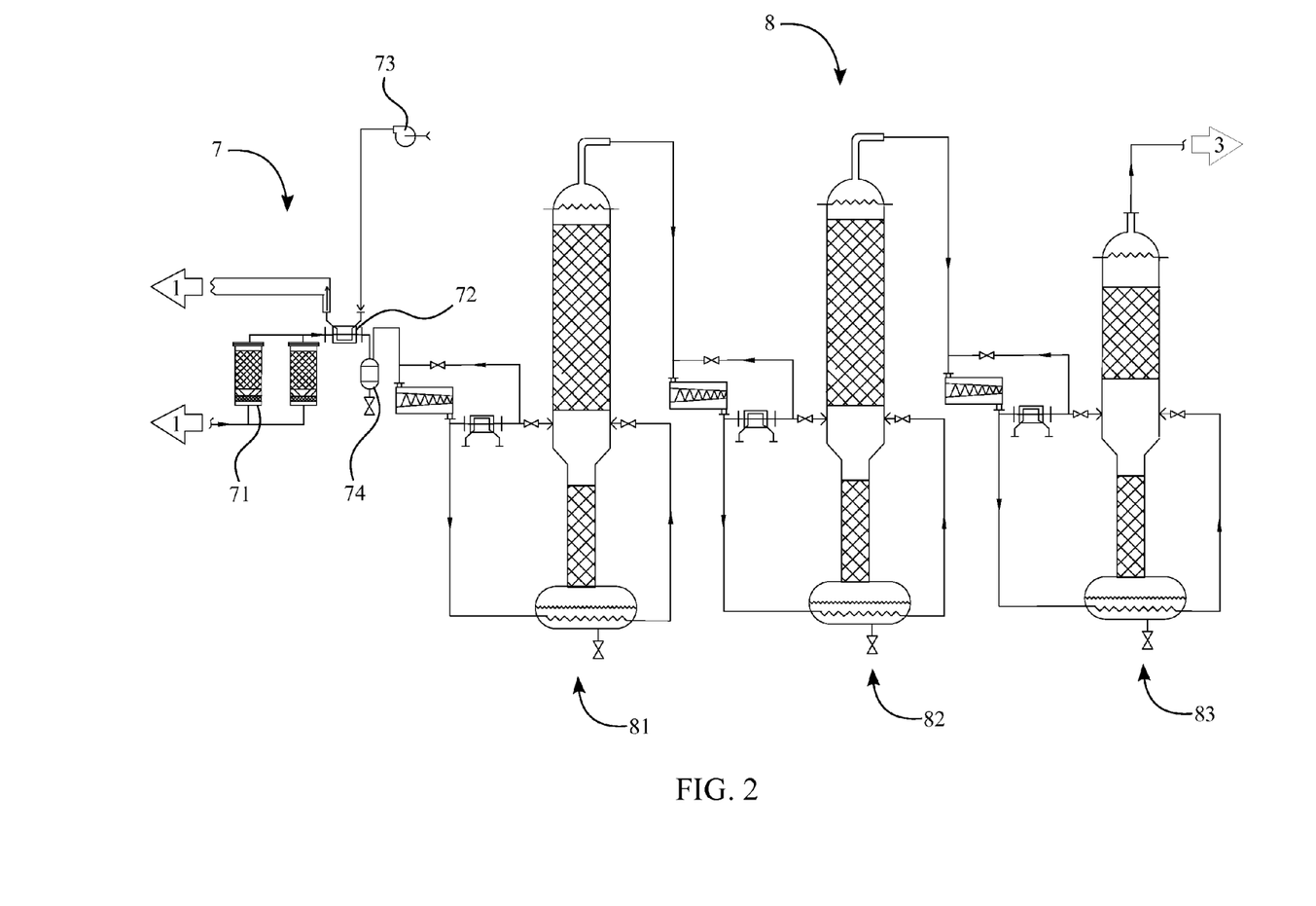
FIG. 2 is a process flow diagram of the preferred system of the present invention and is a continuation of FIG. 1.

In reference to FIG. 2 and FIG. 6, the pyrolysis gas leaving the cooling unit 7 is then transferred through the distillation tower system 8 to separate a plurality of product gases and a combustible gas stream. The distillation tower system 8 which completes this process comprises a first fractional distillation unit 81, a second fractional distillation unit 82, and a third fractional distillation unit 83 as each of the fractional distillation units functions with different parameters to obtain different product gases. More specifically, the first fractional distillation unit 81 is in serial fluid communication with the condensing drum 74 of the cooling unit 7 through a compressor unit 84 of the first fractional distillation unit 81 and isolates pentane plus isomer gases as the plurality of product gases. The second fractional distillation unit 82 is in serial fluid communication with the first fractional distillation unit 81 through a compressor unit 84 of the second fractional distillation unit 82, opposite of the cooling unit 7, so that the second fractional distillation unit 82 is able to isolate butane isomer gases as the plurality of product gases. The third fractional distillation unit 83 is in serial fluid communication with the second fractional distillation unit 82 through a compressor unit 84 of the third fractional distillation unit 83 and positioned opposite of the first fractional distillation unit 81, so that the third fractional distillation unit 83 is able to isolate propane isomer gases as the plurality of product gases.

Figure 5:
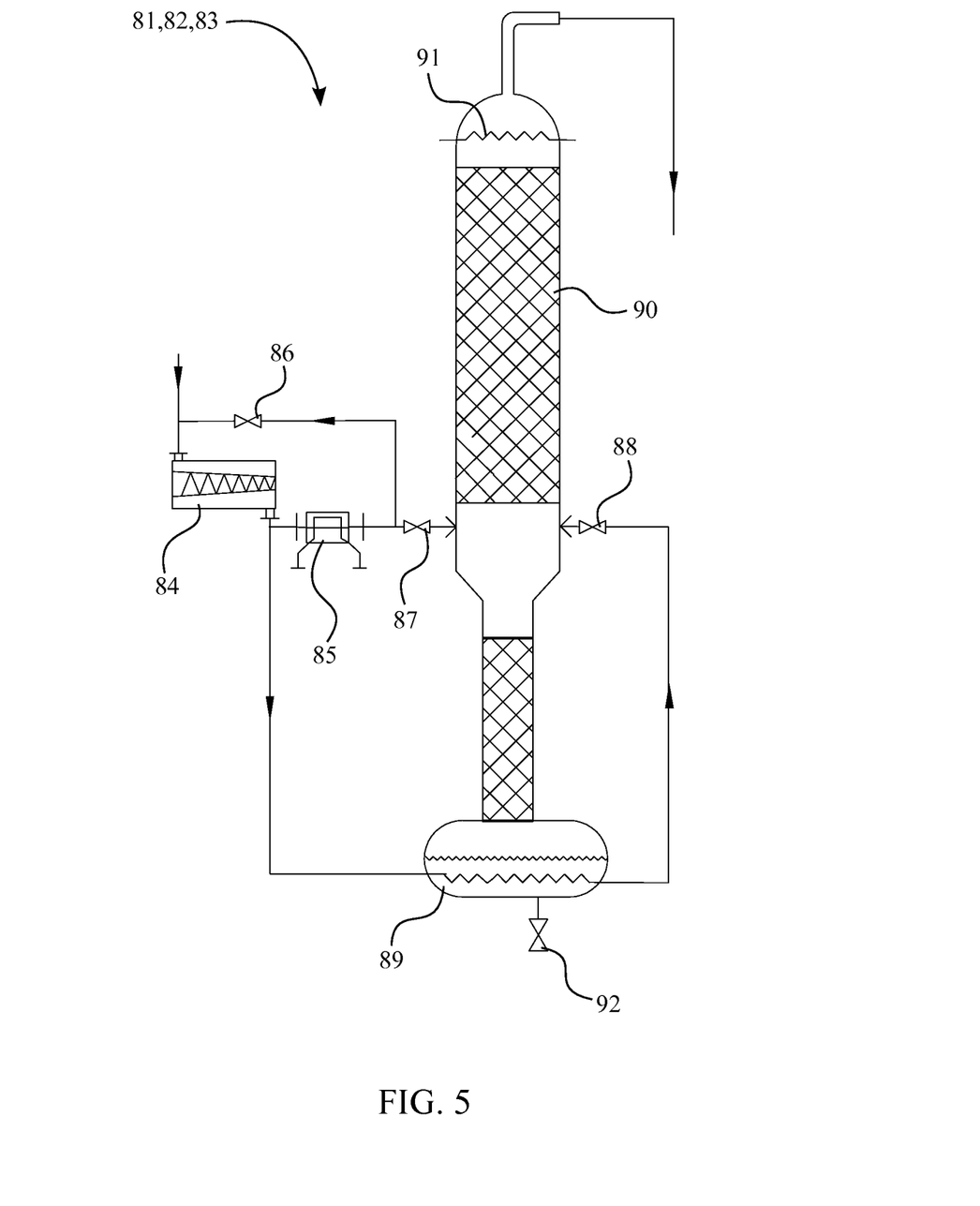
FIG. 5 is a detail view of one of the fractional distillation unit of the preferred system of the present invention.

In reference to FIG. 5, the first fractional distillation unit 81, the second fractional distillation unit 82, and the third fractional distillation unit 83 each comprises a heat exchanger 85, a recycle control valve 86, a first pressure control valve 87, a second pressure control valve 88, a re-boiler unit 89, a distillation column 90, a reflex condenser 91, and a discharge valve 92 in addition to the compressor unit 84. Each of the fractional distillation units is configured with the aforementioned components so that the pyrolysis gas can pass through the distillation tower system 8. More specifically, the pyrolysis gas is compressed into the required chamber pressure through the compressor unit 84 so that the pyrolysis gas can be transformed into respective product gases within the distillation column 90. The re-boiler unit 89 is in fluid communication with the compressor unit 84 while the discharge valve 92 is in fluid communication with the re-boiler unit 89. The re-boiler unit 89 is in fluid communication with the distillation column 90 through the second pressure control valve 88 so that the pyrolysis gas is able to serially travel from the compressor unit 84 to the distillation column 90 through the re-boiler unit 89 and the second pressure control valve 88. In other words, the pyrolysis gas flow is directed to the distillation column 90 through the re-boiler unit 89 and the second pressure control valve 88 as the heat energy of the re-boiler unit 89 indirectly increases the temperature of the pyrolysis gas and the second pressure control valve 88 depressurizes the pyrolysis gas near the midsection of the distillation column 90. Similar to the re-boiler unit 89, the heat exchanger 85 is also in fluid communication with the compressor unit 84 while the heat exchanger 85 is in fluid communication with the distillation column 90 through the first pressure control valve 87. As a result, the pyrolysis gas from the compressor unit 84 is able to travel into the distillation column 90 through the first pressure control valve 87. In other words, any excess heat energy of the pyrolysis gas that bypasses the re-boiler unit 89 is cooled by heat exchanger 85 and discharged into the midsection of the distillation column 90 through the first pressure control valve 87. The recycle control valve 86 is in fluid communication with the heat exchanger 85 and the compressor unit 84 so that the pyrolysis gas can be looped back into the compressor unit 84 when necessary. The combine functionality of the first pressure control valve 87, the second pressure control valve 88, and the recycle control valve 86 maintain the feeding pressure into the distillation column 90 so that the respective product gases can be trapped within the distillation column 90. The reflex condenser 91 is operatively positioned within the distillation column 90 and permits all condensable gases to carry down the distillation column 90 and the re-boiler unit 89 and into the discharge valve 92.

Figure 8:
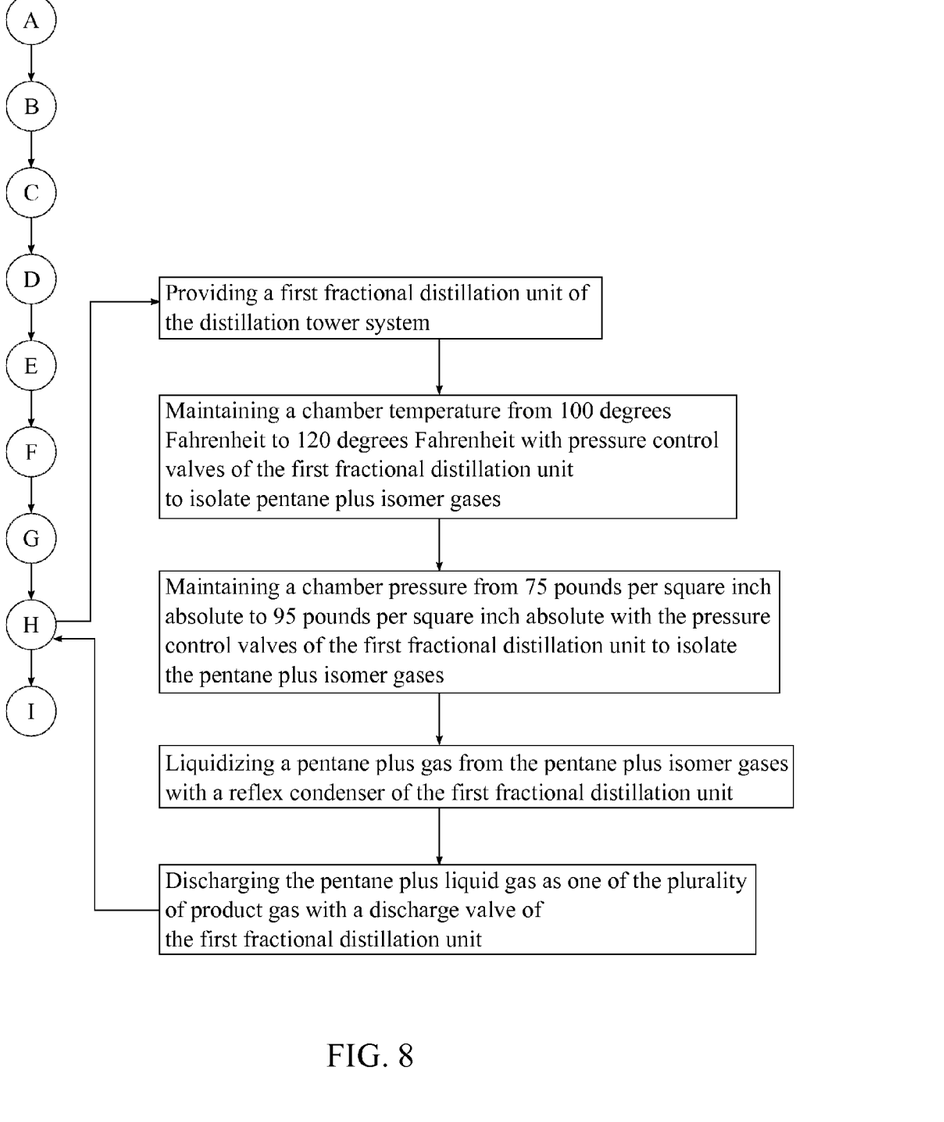
FIG. 8 is a basic process for the first fractional distillation unit of the preferred method within the overall process.

In reference to the first fractional distillation unit 81 that is illustrated in FIG. 8, the pyrolysis gas is compressed from the 1 to 2 atmosphere to a range of 75 pounds per square inch absolute (PSIA) to 95 PSIA through the compressor unit 84. Since the combine functionality of the first pressure control valve 87, the second pressure control valve 88, and the recycle control valve 86 attain the chamber pressure range of 75 PSIA to 95 PSIA within the first fractional distillation unit 81, a chamber temperature of 100 F to 120 F can also be maintained within the distillation column 90. Then the chamber pressure and the chamber temperature are able to isolate pentane plus isomer gases within the first fractional distillation unit 81. Once the pentane plus isomer gases are isolated within the distillation column 90, the reflex condenser 91 is able to liquidize a pentane plus gas away from the pentane plus isomer gases. Then the pentane plus liquid gas can be collected with the discharge valve 92 of the first fractional distillation unit 81 as a first product gas of the plurality of product gases.

Figure 9:
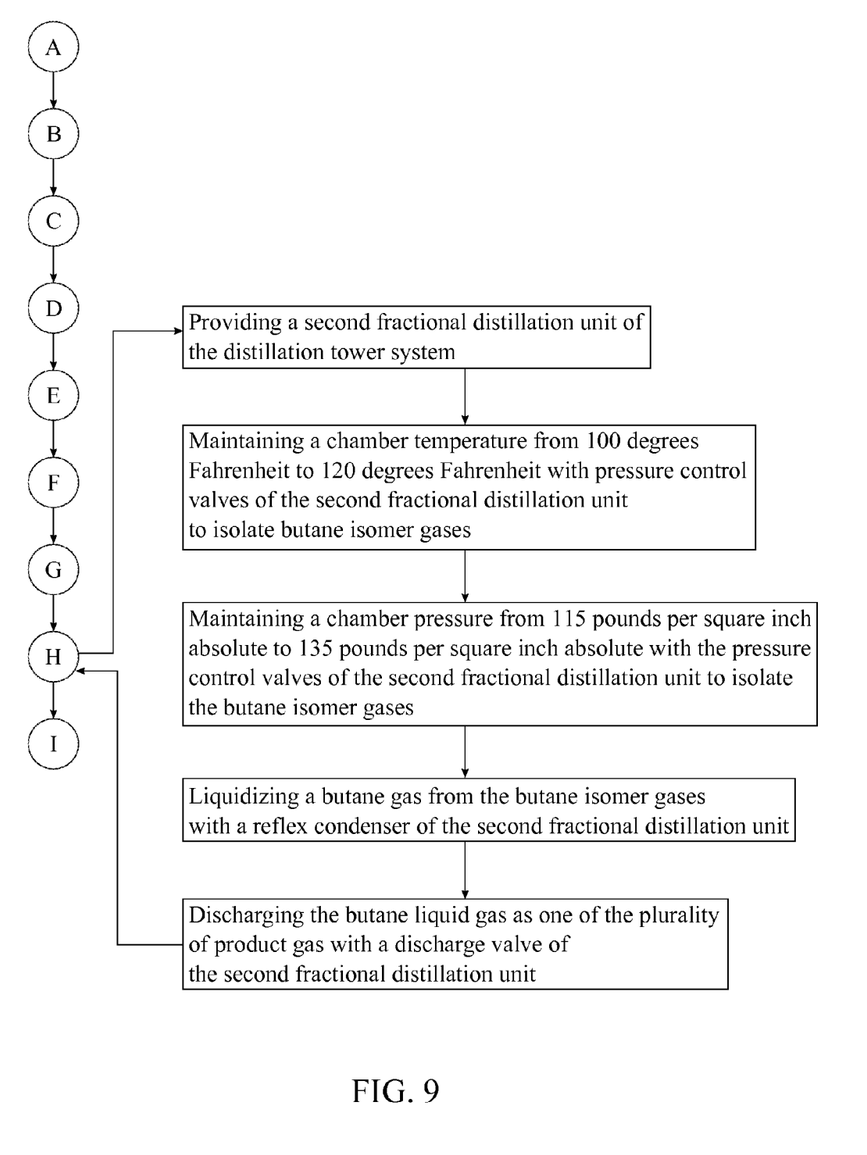
FIG. 9 is a basic process for the second fractional distillation unit of the preferred method within the overall process.

In reference to the second fractional distillation unit 82 that is illustrated in FIG. 9, the pyrolysis gas is compressed from the range of 75 PSIA to 95 PSIA to a range of 115 PSIA to 135 PSIA through the compressor unit 84. Since the combine functionality of the first pressure control valve 87, the second pressure control valve 88, and the recycle control valve 86 attain the chamber pressure range of 115 PSIA to 135 PSIA within the second fractional distillation unit 82, a chamber temperature of 100 F to 120 F can also be maintained within the distillation column 90. Then the chamber pressure and the chamber temperature are able to isolate butane isomer gases within the second fractional distillation unit 82. Once the butane isomer gases are isolated within the distillation column 90, the reflex condenser 91 is able to liquidize a butane gas away from the butane isomer gases. Then the butane liquid gas can be collected with the discharge valve 92 of the second fractional distillation unit 82 as a second product gas of the plurality of product gases.

Figure 10:
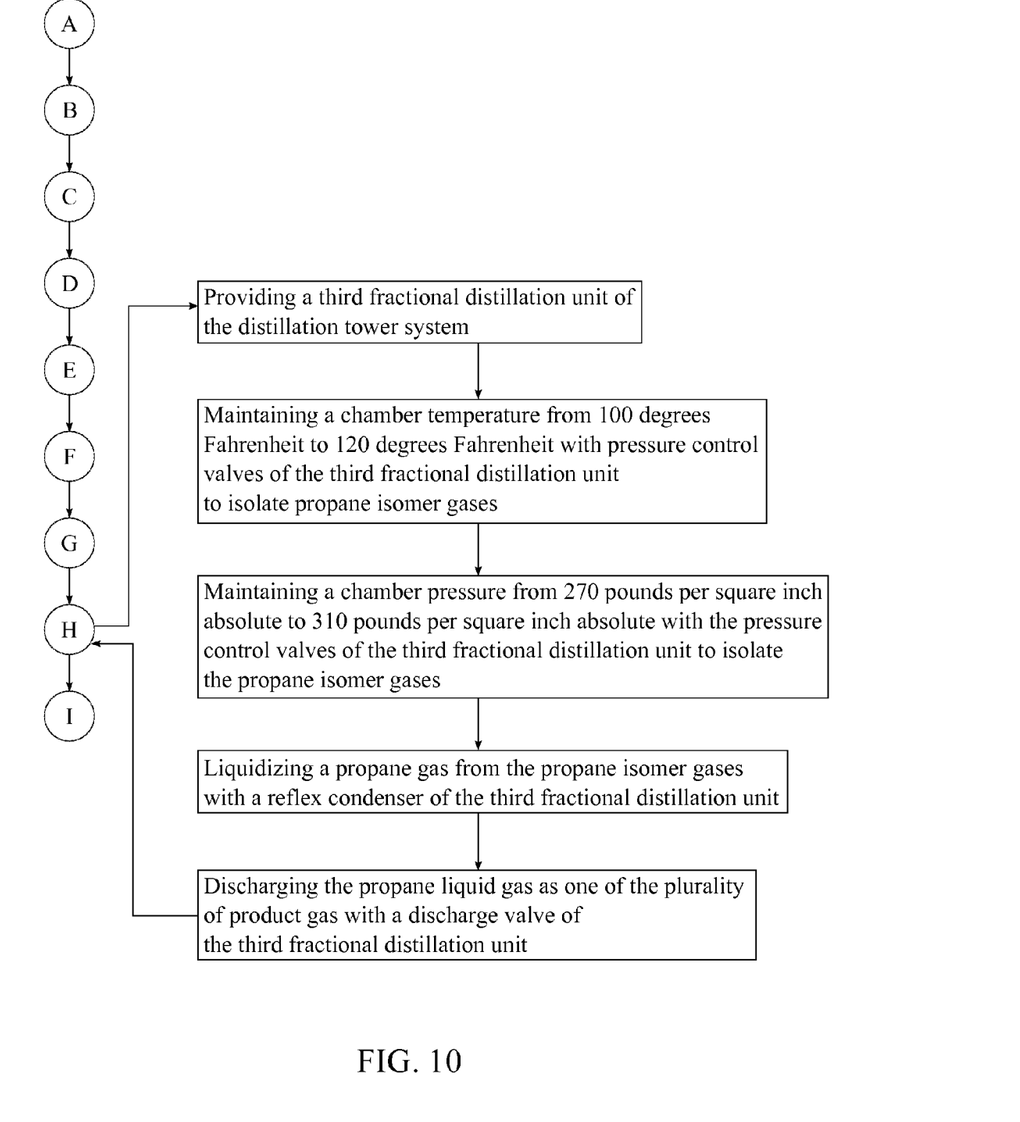
FIG. 10 is a basic process for the third fractional distillation unit of the preferred method within the overall process.

In reference to the third fractional distillation unit 83 that is illustrated in FIG. 10, the pyrolysis gas is compressed from the range of 115 PSIA to 135 PSIA to a range of 270 PSIA to 310 PSIA through the compressor unit 84. Since the combine functionality of the first pressure control valve 87, the second pressure control valve 88, and the recycle control valve 86 attain the chamber pressure range of 270 PSIA to 310 PSIA within the third fractional distillation unit 83, a chamber temperature of 100 F to 120 F can also be maintained within the distillation column 90. Then the chamber pressure and the chamber temperature are able to isolate propane isomer gases within the third fractional distillation unit 83. Once the propane isomer gases are isolated within the distillation column 90, the reflex condenser 91 is able to liquidize a propane gas away from the propane isomer gases. Then the propane liquid gas can be collected with the discharge valve 92 of the third fractional distillation unit 83 as a third product gas of the plurality of product gases.

The first fractional distillation unit 81, the second fractional distillation unit 82, and the third fractional distillation unit 83 may setup to handle a pushbutton start of the preferred system that allowed for a continuous and automatic control of the chamber pressure and chamber temperature within each unit. Even though the preferred system given above utilizes three fractional distillation units to generate the plurality of product gases, alternative systems of the present invention may comprise any number of fractional distillation units and the necessary parameters to service multiple and continuous large distillation tower system 8 or to expand the number of product gases.

Figure 3:
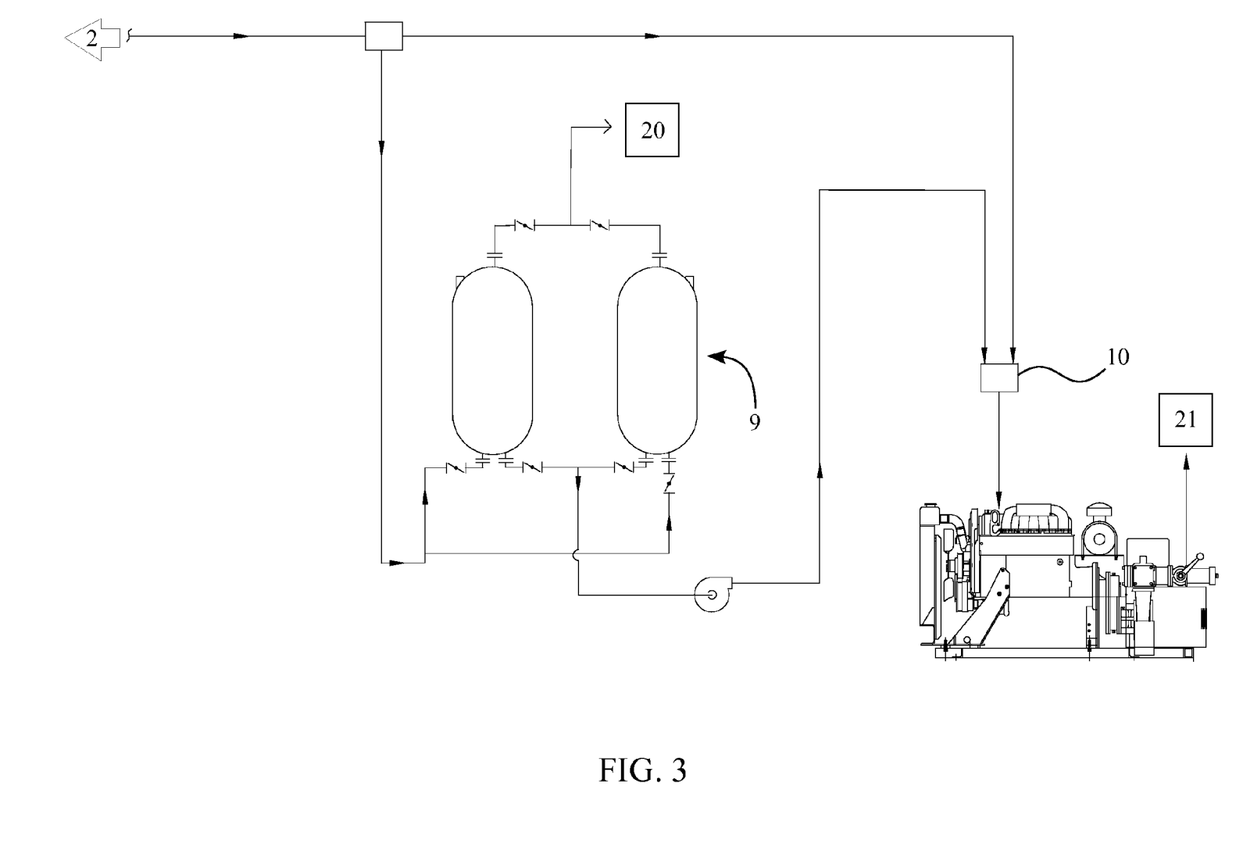
FIG. 3 is a process flow diagram of the preferred system of the present invention and is a continuation of FIG. 2.
Figure 11:
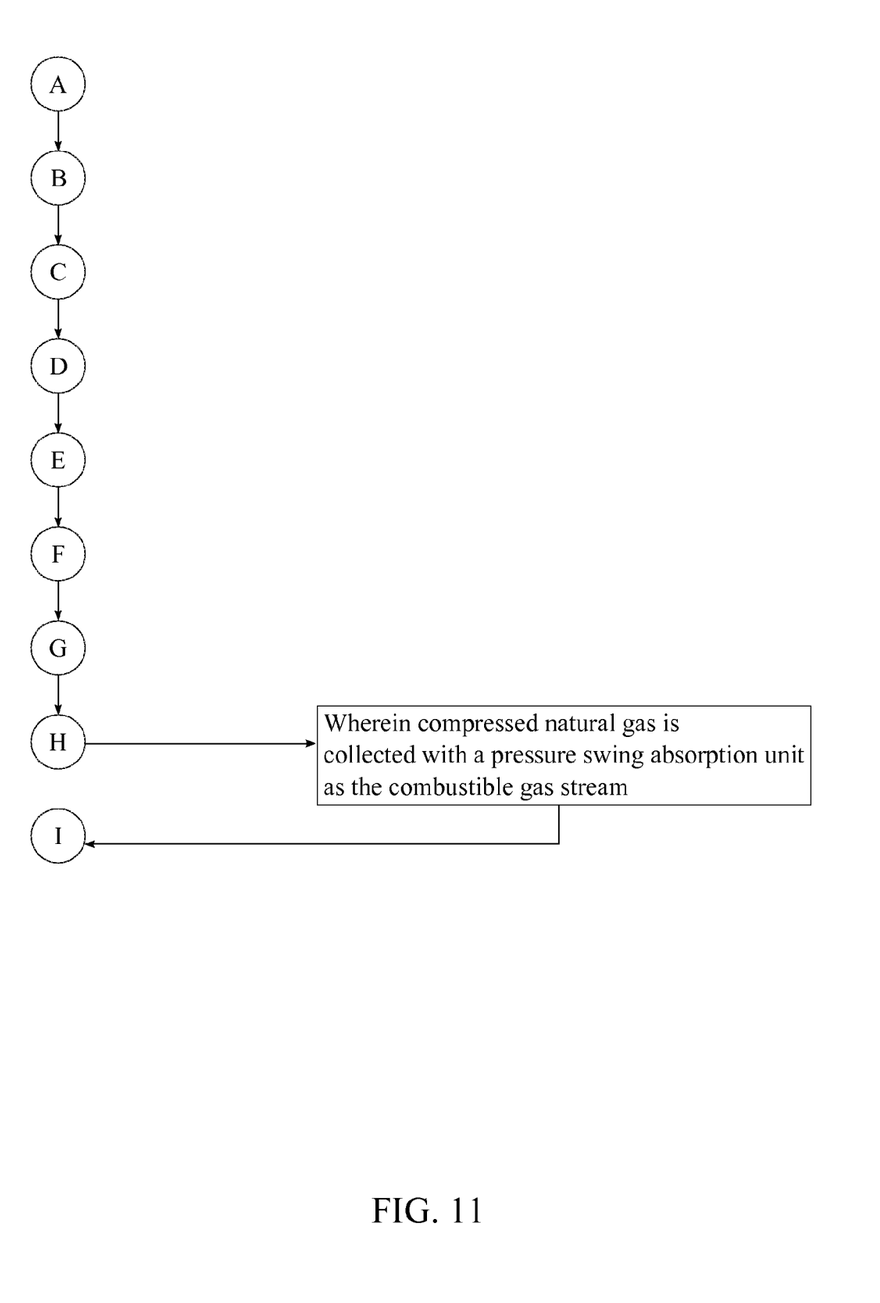
FIG. 11 is a process of isolating natural gas within the preferred method of the overall process.
Figure 12:
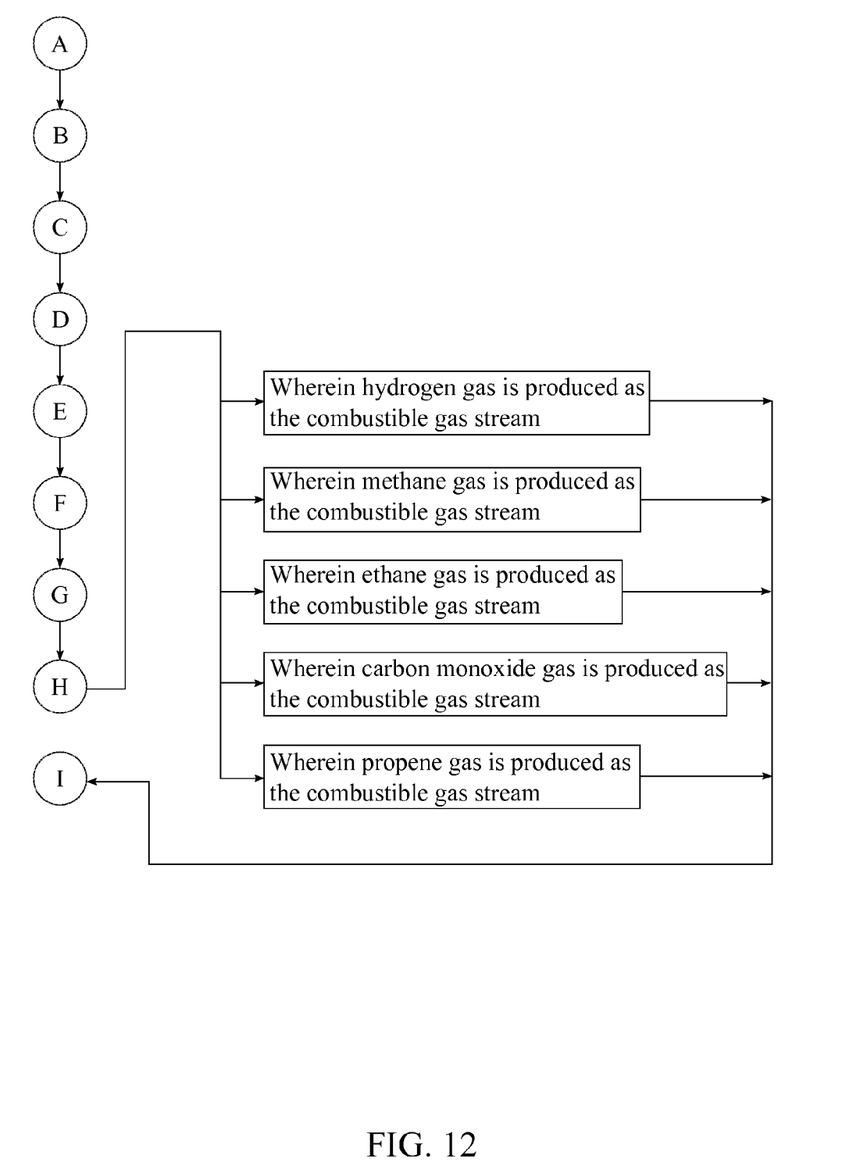
FIG. 12 is a process of isolating combustible gas stream within the preferred method of the overall process.

In reference to FIG. 2, FIG. 3 and FIG. 11, the at least one gas discharge port 10 is in fluid communication with the third fractional distillation unit 83 to transfer the combustible gas stream. More specifically, once the plurality of product gases is removed from the pyrolysis gas, the remaining gas stream becomes the combustible gas stream and exists from the distillation tower system 8 through the third fractional distillation unit 83. The combustible gas stream within the preferred method is utilized to power an alternative power source such as a combustible engine to generate electricity 21. In addition to the combustible engine, a pressure swing absorption unit 9 may serially and jointly in fluid communication with the at least one gas discharge port 10 to collect natural gas 20 as one of the combustible gas stream. The off steam gas from the pressure swing absorption unit 9 may utilize an additional vacuum blower to pump the combustible gas stream into the combustible engine. In reference to FIG. 12, whether the pressure swing absorption unit 9 is utilized within the preferred system or not, the preferred method is able to power the combustible engine with the combustible gas stream that may consist of hydrogen gas, methane gas, ethane gas, carbon monoxide gas, and propene gas.

The present invention is carried out through the following test runs to ensure the feasibility of the preferred system and the preferred method. During a first two and half hour test run, the chamber pressure setting of the preferred system is changed twice to demonstrate the flexibility of the distillation tower system 8 and the distillation process in regards to the chamber pressure and chamber temperature ranges of the pentane plus isomer gases, the butane isomer gases, and the propane isomer gases. As a result of this flexible chamber pressures, the preferred system had no problems achieving the proper product gases and the chamber temperatures as the first two and half hour test run was accomplished on a cool day with the ambient temperature range of 30 F to 45 F. During a second 13.5 hour test run, that was accomplished on a warm day leading into a cool night from with the ambient temperature range of 70 F to 40 F, the distillation column 90 and the re-boiler unit 89 of the distillation tower system 8 were preheated by electrical heat energy and the reflex condenser 91 was not preheated to allow increased reflux on startup of the preferred system. The reflex condenser 91 temperatures in all three fractional distillation units, which over time, changed due to increased vapor/liquid hold up, increased each distillation column 90's total liquids, and resulting liquid to liquid heat transfer of the reflex condenser 91. Once all three of the distillation columns 90 reach the desired controlled energy balance, the preferred system production mode stabilizes and small needed changes in chamber pressure, chamber temperature, and gas flow, by the automated control system, allows the preferred system to maintain proper product quality. After each test run was completed, three samples were collected from each fractional distillation unit as the plurality of product gases. The first fractional distillation unit 81 produced a predicable pentane plus liquid gas and water mixture of about 250 grams that contained 25% water. Additionally, the first fractional distillation unit 81 also prevent any carryover of pentane plus isomer gases into the first fractional distillation unit 81 and the second fractional distillation unit 82. The second sample, which is collected from the second fractional distillation unit 82, showed an increase liquid weight of 45 grams over the first sample while functioning similar to the first fractional distillation unit 81. The third sample, which is collected from the third fractional distillation unit 83, showed an increase liquid weight of 60 grams over the first sample while functioning similar to the first fractional distillation unit 81.

Municipal waste that is processed through the pyrolysis unit 5 creates a manageable syngas gas stream that can be separated by the distillation process of the distillation tower system 8. By utilizing the preferred system and the preferred method, one can design a full size system and method which would produce predicable outputs. By precisely controlling the raw biomass material input to the pyrolysis unit 5, a repeatable synthetic gas (syngas) stream mixture can be produced for the pyrolysis gas and liquid separation phase of the plurality of product gases; making it possible to manufacture a continuous full scale unit that would produce a predictable and repeatable product liquid/gases. With the addition of an efficient control system and proper auxiliary control devices, the preferred system is able to shift chamber pressures and chamber temperatures to create a multitude of blended products gases for a changing market place.

Although the invention has been explained in relation to its preferred embodiment, it is to be understood that many other possible modifications and variations can be made without departing from the spirit and scope of the invention as hereinafter claimed.

What is claimed is:

1. A system for converting biomass material into energy products comprises:
    a screen-conveyer belt unit;
    a hot-air conduit system;
    a material crusher;
    a transferring-conveyer belt system;
    a pyrolysis unit;
    a centrifuge unit;
    a cooling unit;
    a distillation tower system;
    at least one gas discharge port;
    the pyrolysis unit comprises a first pyrolysis chamber, a second pyrolysis chamber, a third pyrolysis chamber, a fourth pyrolysis chamber and a fifth pyrolysis chamber;
    the screen-conveyer belt unit being in fluid communication with the hot-air conduit system;
    the screen-conveyer belt unit being operatively coupled with the material crusher;
    the material crusher being operatively coupled with the pyrolysis unit through the transferring-conveyer belt system;
    the pyrolysis unit being in fluid communication with the cooling unit through the centrifuge unit; and
    the cooling unit being in fluid communication with the at least one gas discharge port through the distillation tower system.

2. The system for converting biomass material into energy products as claimed in claim 1 comprises:
    the first pyrolysis chamber being adjacently positioned with the transferring-conveyer belt system;
    the second pyrolysis chamber being adjacently positioned with the first pyrolysis chamber, opposite of the transferring-conveyer belt system;
    the fifth pyrolysis chamber being adjacently positioned with the second pyrolysis chamber, opposite of the first pyrolysis chamber;
    the third pyrolysis chamber being adjacently positioned with the fifth pyrolysis chamber, opposite of the second pyrolysis chamber; and
    the fourth pyrolysis chamber being adjacently positioned with the third pyrolysis chamber, opposite of the fifth pyrolysis chamber.

3. The system for converting biomass material into energy products as claimed in claim 1 comprises:
    the pyrolysis unit further comprises a pneumatic entry door, a first pneumatic release door, a second pneumatic release door, a third pneumatic release door, a fourth pneumatic release door, and a pneumatic discharge door;
    the pneumatic entry door being positioned with the first pyrolysis chamber;
    the first pneumatic release door being adjacently positioned between the first pyrolysis chamber and the second pyrolysis chamber;
    the second pneumatic release door being adjacently positioned between the second pyrolysis chamber and the fifth pyrolysis chamber;
    the third pneumatic release door being adjacently positioned between the fifth pyrolysis chamber and the third pyrolysis chamber;
    the fourth pneumatic release door being adjacently positioned between the third pyrolysis chamber and the fourth pyrolysis chamber; and
    the pneumatic discharge door being positioned with the fourth pyrolysis chamber, opposite of the fourth pneumatic release door.

4. The system for converting biomass material into energy products as claimed in claim 1 comprises:
- the pyrolysis unit further comprises a first vacuum blower, a second vacuum blower, a third vacuum blower, a fourth vacuum blower and a fifth vacuum blower;
- the first pyrolysis chamber being in fluid communication with the hot-air conduit system through the first vacuum blower;
- the second pyrolysis chamber being in fluid communication with the second vacuum blower;
- the fifth pyrolysis chamber being in fluid communication with the fifth vacuum blower with a first outlet of the fifth pyrolysis chamber;
- the third pyrolysis chamber being in fluid communication with the third vacuum blower;
- the fourth pyrolysis chamber being in fluid communication with the hot-air conduit system through the fourth vacuum blower;
- the second vacuum blower and the third vacuum blower being in fluid communication with the fifth pyrolysis chamber through the fifth vacuum blower; and
- the fifth pyrolysis chamber being in fluid communication with the centrifuge unit with a second outlet of the fifth pyrolysis chamber.

5. The system for converting biomass material into energy products as claimed in claim 1 comprises:
- the cooling unit comprises a filter unit, a primary heat exchanger, an inlet air blower, and a condensing drum;
- the filter unit being in fluid communication with a second outlet of the fifth pyrolysis chamber; and
- the primary heat exchanger being in fluid communication with the filter unit, the inlet air blower, the hot-air conduit system, and the condensing drum.

6. The system for converting biomass material into energy products as claimed in claim 1 comprises:
- the distillation tower system comprises a first fractional distillation unit, a second fractional distillation unit, and a third fractional distillation unit;
- the first fractional distillation unit, the second fractional distillation unit, and the third fractional distillation unit each comprises a compressor unit;
- the first fractional distillation unit being in serial fluid communication with a condensing drum of the cooling unit through the compressor unit of the first fractional distillation unit;
- the second fractional distillation unit being in serial fluid communication with the first fractional distillation unit through the compressor unit of the second fractional distillation unit, opposite of the cooling unit; and
- the third fractional distillation unit being in serial fluid communication with the second fractional distillation unit through the compressor unit of the third fractional distillation unit, opposite of the first fractional distillation unit.

7. The system for converting biomass material into energy products as claimed in claim 6 comprises:
- the first fractional distillation unit, the second fractional distillation unit, and the third fractional distillation unit each further comprises a heat exchanger, a recycle control valve, a first pressure control valve, a second pressure control valve, a re-boiler unit, a distillation column, a reflex condenser, and a discharge valve;
- the heat exchanger being in fluid communication with the compressor unit;
- the re-boiler unit being in fluid communication with the compressor unit;
- the discharge valve being in fluid communication with the re-boiler unit;
- the recycle control valve being in fluid communication with the heat exchanger and the compressor unit;
- the heat exchanger being in fluid communication with the distillation column through the first pressure control valve;
- the re-boiler unit being in fluid communication with the distillation column through the second pressure control valve; and
- the reflex condenser being operatively positioned within the distillation column.

8. The system for converting biomass material into energy products as claimed in claim 1, wherein the at least one gas discharge port being in fluid communication with the third fractional distillation unit.

9. The system for converting biomass material into energy products as claimed in claim 8, wherein a pressure swing absorption unit being in fluid communication with the third fractional distillation unit and the at least one gas discharge port.

* * * * *